US005790240A

United States Patent [19]
Ishikawa et al.

[11] Patent Number: 5,790,240
[45] Date of Patent: Aug. 4, 1998

[54] IMAGE EXPOSURE SYSTEM

[75] Inventors: Masazumi Ishikawa; Toru Tanibata, both of Wakayama, Japan

[73] Assignee: Noritsu Koki Co., Ltd., Wakayama-ken, Japan

[21] Appl. No.: 819,132

[22] Filed: Mar. 17, 1997

[30] Foreign Application Priority Data

Mar. 25, 1996 [JP] Japan ................................ 8-068108

[51] Int. Cl.$^6$ ................................................. G03B 27/72
[52] U.S. Cl. ............................ 355/68; 355/35; 355/41; 355/71
[58] Field of Search ...................... 355/35, 37, 38, 355/67, 68, 69, 70, 71, 40, 41; 347/236, 239; 250/559.02, 559.1

[56] References Cited

U.S. PATENT DOCUMENTS

| 4,751,377 | 6/1988 | Ishizaka et al. | 355/67 |
| 5,337,117 | 8/1994 | Tanibata | 355/19 |
| 5,428,422 | 6/1995 | Tanibata | 355/40 |
| 5,430,523 | 7/1995 | Tanibata | 355/32 |
| 5,488,450 | 1/1996 | Tanabata | 355/38 |
| 5,555,073 | 9/1996 | Grossman et al. | 355/41 |
| 5,602,618 | 2/1997 | Tanibata | 355/40 |
| 5,661,544 | 8/1997 | Ishikawa et al. | 355/41 |

FOREIGN PATENT DOCUMENTS

| 380877 | 8/1990 | European Pat. Off. | |
| 615154 | 9/1994 | European Pat. Off. | |
| 0629905 A2 | 12/1994 | European Pat. Off. | G03B 27/73 |

OTHER PUBLICATIONS

Patent Abstracts of Japan, vol. 018, No. 244 (P-1734), 10 May 1994 & JP 06 027551 A (Konica Corp), 4 Feb. 1994.

Primary Examiner—A. A. Mathews
Attorney, Agent, or Firm—Jordan and Hamburg

[57] ABSTRACT

An image exposure system for printing an image, comprised of pixels, on photosensitive media based on image data, includes an exposure unit for converting the image data into a light signal for exposure of each of the pixels, a measuring device and a compensator used to correct exposure levels. The exposure unit has light output elements for outputting the light signal for respective ones of the pixels onto the photosensitive media to effect exposure of the image on the photosensitive media. The measuring device is for measuring a density of each of the pixels of the image on the photosensitive media produced by exposing the photosensitive media with reference image data as the image data. The compensator corrects exposure levels of the pixels based on density data obtained by the measuring device, using the density data of a darkest one of the pixels as a reference to reduce differences between the exposure levels produced by respective ones of the output elements caused by changes in output characteristics of the exposure unit. The construction of the exposure system provides for compensation of changes in the light output elements without increasing the size of the exposure unit.

16 Claims, 7 Drawing Sheets

IMAGE EXPOSURE SYSTEM

BACKGROUND OF THE INVENTION

This invention relates to an image exposure system comprising an exposure unit which converts image data into a light signal defining specific exposure levels for individual pixels and outputs the light signal onto photographic printing paper.

Image exposure systems which can read image data recorded on a photographic film or a similar recording medium, translate it into a light signal and expose photographic printing paper with the light signal are commonly used in recent years. An exposure unit of this type of image exposure system for exposing the photographic printing paper includes a light source and an exposure head for projecting light emitted from the light source in accordance with the image data onto the photographic printing paper along its widthwise direction.

The exposure head typically comprises a shutter array composed essentially of a lead lanthanum zirconate titanate (PLZT) device. The PLZT device includes a plurality of shutter elements aligned in a linear array that are formed from a translucent ferroelectric ceramic material obtained by adding lanthanum to lead zirconate titanate (PZT). Operation of this shutter array (hereinafter referred to as the PLZT shutter array) is as follows. When a driving voltage is applied to a shutter element located at a position corresponding to a particular pixel of the original image data, the shutter element opens, allowing the light from the light source to pass through the shutter element and fall on the photographic printing paper to expose it.

One problem encountered with the image exposure system thus constructed is that output characteristics of the exposure unit can vary due to changes in light transmitting characteristics of the shutter elements with the lapse of time, causing differences in the intensity of light passing through the individual shutter elements. This can result in large variations in exposure levels achieved with the individual shutter elements and eventual degradation in the fidelity of image reproduction. A conventional approach taken in coping with this problem is to install an optical sensor beneath the PLZT shutter array for measuring the intensity of light transmitted through the individual shutter elements and alter their output light intensities to cancel out, or minimize, the differences in exposure levels among the individual shutter elements in accordance with correction data obtained from output signals of the optical sensor.

The aforementioned image exposure system employing the built-in optical sensor is however associated with another problem that dimensions of the exposure unit become too large. This is because the PLZT shutter array is required to completely cover the width of the photographic printing paper which is advanced in a particular direction to enable exposure all across the photographic printing paper, and the optical sensor for measuring the intensity of light transmitted through the individual shutter elements should cover the whole shutter elements.

SUMMARY OF THE INVENTION

It is an object of the present invention to provide an image exposure system which overcomes the problems residing in the prior art.

It is another object of the present invention to provide an image exposure system which allows automatic exposure level correction of individual light output elements of an exposure unit to minimize differences in exposure levels among the individual light output elements without causing an increase in physical dimensions of the exposure unit.

According to the present invention, an image exposure system comprises an exposure unit having a plurality of light output elements for converting image data into a light signal which causes a specific level of exposure of each pixel and outputting the light signal onto photographic printing paper to expose it, a measuring device for measuring the density of each pixel of an image produced by exposing the photographic printing paper with reference image data at the exposure unit, and a compensator for correcting exposure levels achieved with the individual light output elements based on measurement results obtained by the measuring device to reduce differences in the exposure levels among the individual light output elements caused by changes in output characteristics of the exposure unit.

The image exposure system thus constructed makes it possible to automatically correct the exposure levels achieved with the individual light output elements to reduce the differences in the exposure levels based on pixel density data obtained by the measuring device. Also, this eliminates an optical sensor, and can thus assure a compact size for the exposure unit.

These and other objects, features and advantages of the invention will become more apparent upon reading the following detailed description in conjunction with the accompanying drawings.

DETAILED DESCRIPTION OF THE INVENTION

Figure 1:
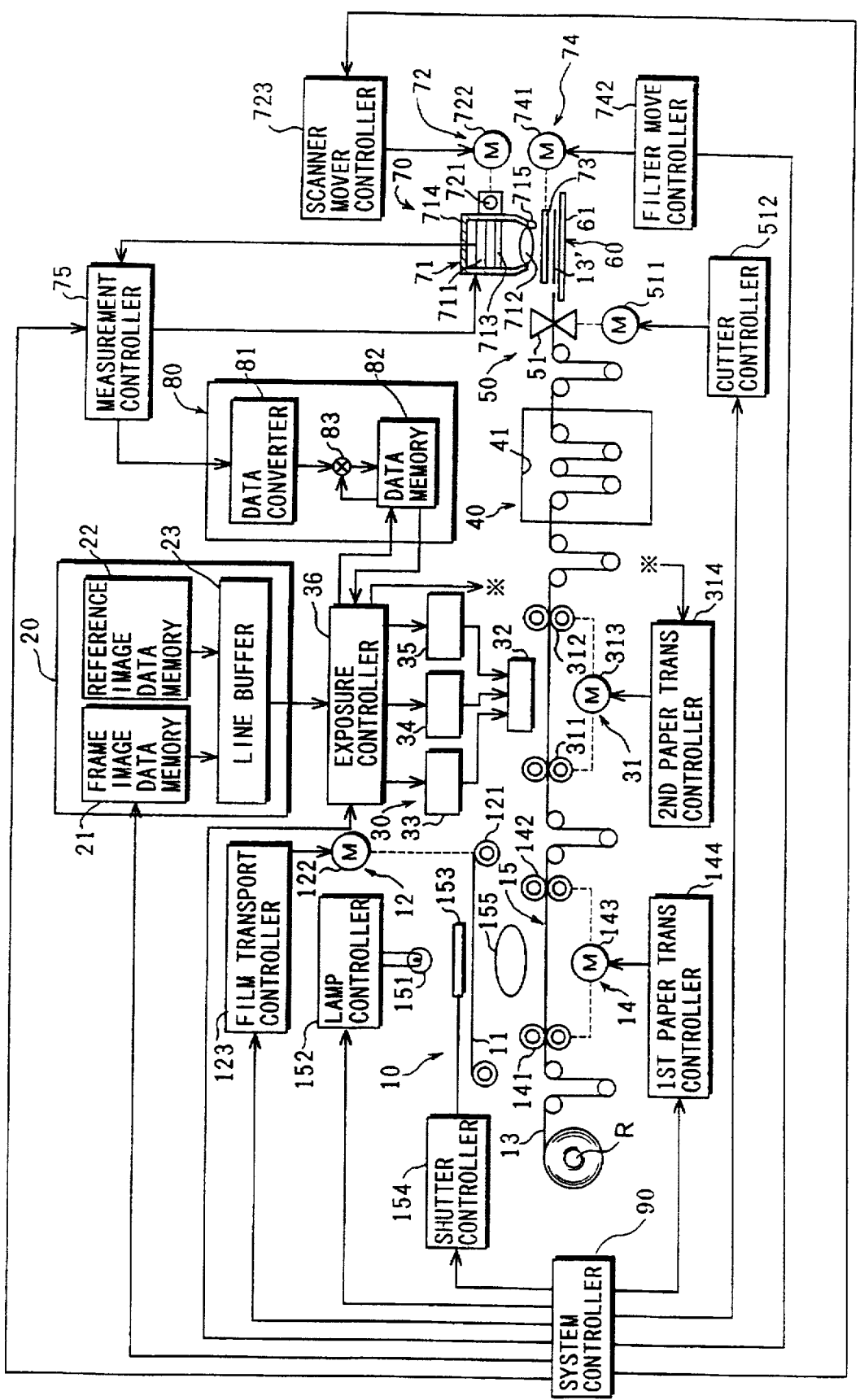
FIG. 1 is a block diagram generally showing a configuration of an automatic photograph printing system employing an image exposure system according the invention.

FIG. 1 is a block diagram generally showing the configuration of an automatic photograph printing system employing an image exposure system according to a preferred embodiment of the invention. As shown in the FIG. 1, the automatic photograph printing system comprises a first exposure processor 10 for exposing photographic printing paper 13 by projecting images recorded on an negative film 11 upon the photographic printing paper 13, an image information storing unit 20 for storing image data entered from an external system such as a personal computer, a second exposure processor 30 for exposing the photographic printing paper 13 by converting the image data fed from the image information storing unit 20 into a light signal and outputting it onto the photographic printing paper 13, a development processor 40 for developing an exposed portion of the photographic printing paper 13, a cutting unit 50 for cutting the photographic printing paper 13 into individual picture frames after printing and drying, a discharge unit 60 to which already cut photographic prints are delivered, a measuring unit 70 for measuring photographic densities of individual pixels of each photographic print delivered to the discharge unit 60, a data conversion unit 80 for converting density data output from the measuring unit 70 into correction data to be used for exposure level correction of individual light output elements, and a system controller 90 for performing overall control of the system.

The first exposure processor 10 includes a film transport 12 for advancing successive frames of the already developed negative film 11 up to an exposing position of the first exposure processor 10, a first printing paper transport 14 for feeding the elongate photographic printing paper 13 which is initially rolled on a roll R up to the exposing position, and a first exposure unit 15 for exposing the unrolled photographic printing paper 13 with the images recorded in the individual frames of the negative film 11.

The film transport 12 includes a take-up roller 121, a driving motor 122 for turning the take-up roller 121, and a film transport controller 123 for controlling the driving motor 122. The driving motor 122 is run in accordance with a control signal fed from the film transport controller 123, causing the take-up roller 121 to take up the negative film 11 so that it is advanced one frame after another in successive steps.

The first printing paper transport 14 includes two pairs of transfer rollers 141 and 142 located on the upstream and downstream sides of the exposing position, respectively, a driving motor 143 for turning the two pairs of transfer rollers 141 and 142, and a first printing paper transport controller 144 for controlling the driving motor 143. The driving motor 143 is run in accordance with a control signal fed from the first printing paper transport controller 144 to advance the unrolled photographic printing paper 13 in successive steps in synchronism with exposures of the individual picture frames.

The first exposure unit 15 includes a lamp 151 located above the negative film 11, a lamp controller 152 for controlling the luminous intensity of the lamp 151, a shutter 153 located between the lamp 151 and the negative film 11, a shutter controller 154 for controlling open/close operation of the shutter 153, and a lens 155 located between the negative film 11 and the photographic printing paper 13 for focusing each image recorded on the negative film 11 onto the photographic printing paper 13. As the film transport 12 advances the negative film 11, the unrolled photographic printing paper 13 is exposed with the individual images recorded on the negative film 11 one frame after another by opening and closing the shutter 153 in a controlled manner.

The image information storing unit 20 includes a frame image data memory 21 for storing the image data entered from the external system such as a personal computer, a reference image data memory 22 for storing reference image data used when measuring densities of individual pixels of an image printed on the photographic printing paper 13 which is exposed at the later-described second exposure processor 30, and a line buffer 23 for reading each single-line portion of the image data of each image exposed at the second exposure processor 30 from the frame image data memory 21 or the reference image data memory 22 and temporarily storing the read data.

In an alternative arrangement, the frame image data memory 21 of the image information storing unit 20 may store image data read by an imaging sensor like a charge-coupled device (hereinafter referred to as CCD) directly from images recorded on a film instead of the image data entered from the external system. In this case, there should be provided an image reader comprising a CCD or other suitable type of imaging sensor. The frame image data memory 21 and the reference image data memory 22 each incorporate memory areas for separately storing red, green and blue (hereinafter referred to as RGB) image data.

Figure 2:
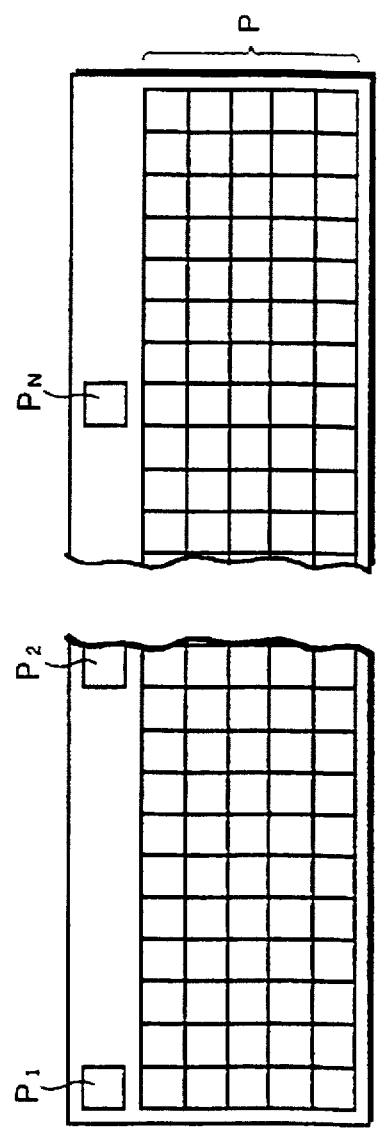
FIG. 2 is a diagrammatic representation of a reference image data stored in the automatic photograph printing system of FIG. 1.

The reference image data stored in the reference image data memory 22 constitutes five lines of gray dot-matrix image P, each line including 2048 pixels, as shown in FIG. 2, for example. Isolated dots $P_1, P_2, \ldots P_N$ shown above the dot-matrix image p in FIG. 2 are position marks placed every 10 columns as a reference for indicating pixel locations in line directions.

The second exposure processor 30 includes a second printing paper transport 31 for feeding the unrolled photographic printing paper 13 up to an exposing position of the second exposure processor 30, a second exposure unit 32 for exposing the photographic printing paper 13, a color filter controller 33, a driving power supply 34 and an image data output controller 35 for controlling exposure operation of the second exposure unit 32, and an exposure controller 36 for controlling the second printing paper transport 31, the color filter controller 33, the driving power supply 34 and the image data output controller 35 in synchronism with the image data delivered from the line buffer 23.

The second printing paper transport 31 includes two pairs of transfer rollers 311 and 312 located on the upstream and downstream sides of the second exposure unit 32, respectively, a driving motor 313 for turning the two pairs of transfer rollers 311 and 312, and a second printing paper transport controller 314 for controlling the driving motor 313. The driving motor 313 is run in accordance with a control signal fed from the second printing paper transport controller 314 to advance the unrolled photographic printing paper 13 to the exposing position in successive steps, each step corresponding to a time duration required for exposure of each individual line of the image data. As the unrolled photographic printing paper 13 is advanced stepwise in this manner, the second exposure unit 32 exposes it with successive lines of the image data with precise exposure timing controlled to match the feeding speed of the unrolled photographic printing paper 13. Exposure of one frame is completed when the photographic printing paper 13 has been exposed with all the lines constituting that frame.

Figure 3:
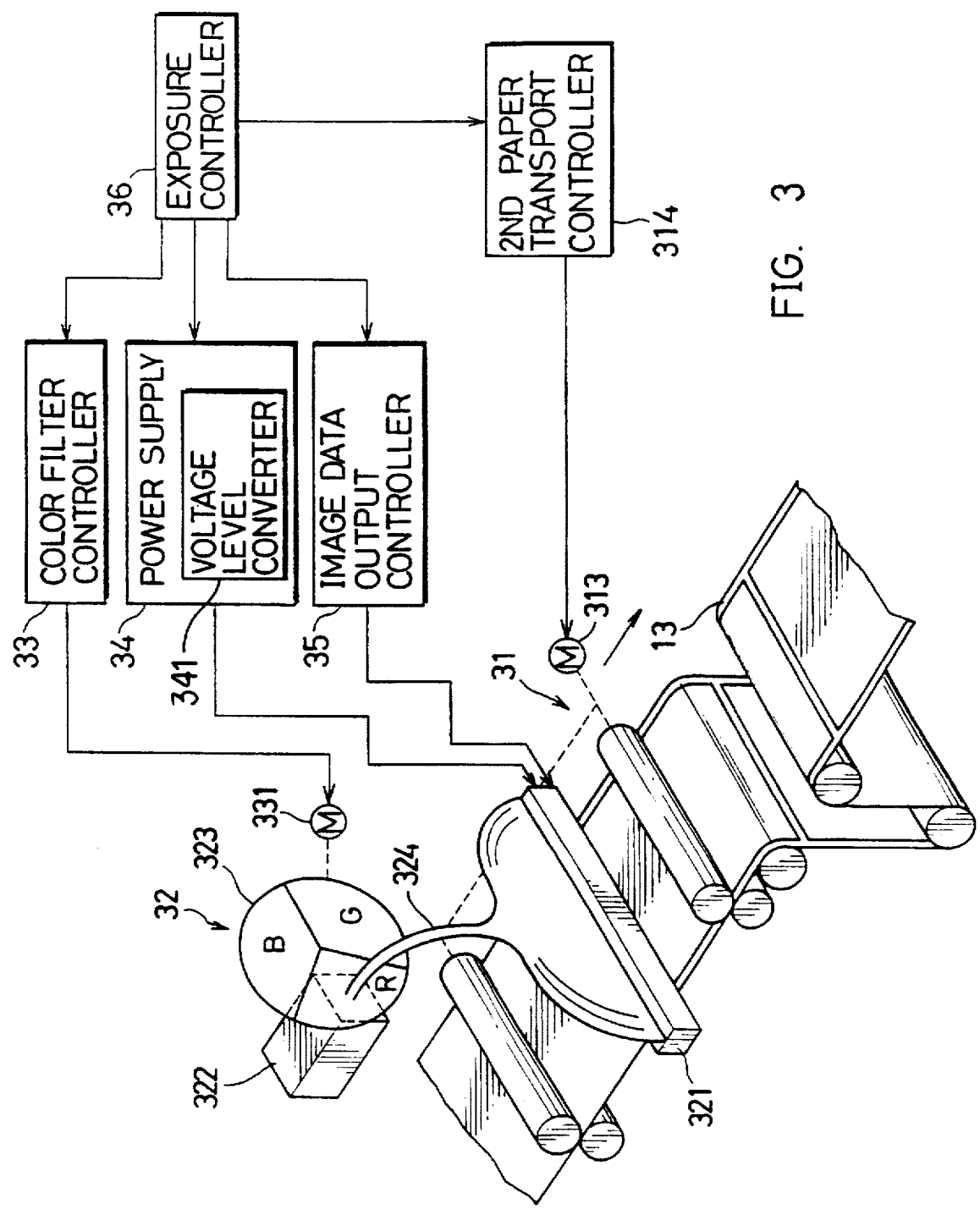
FIG. 3 is a diagram showing a construction of a second exposure unit of the automatic photograph printing system of FIG. 1.

The second exposure unit 32 converts the RGB image data transmitted from the line buffer 23 into a light signal of a specific light intensity and outputs it onto the photographic printing paper 13. As shown in FIG. 3, the second exposure unit 32 includes a PLZT shutter array 321 serving as an exposure head located above the photographic printing paper 13 to completely cover its width perpendicular to the direction in which the photographic printing paper 13 is advanced, a white light source unit 322 serving as the source of light to be emitted from individual light output elements of the PLZT shutter array 321, a disk-like color filter 323 having areas for passing only the red, green, or blue components that is located between the PLZT shutter array 321 and the white light source unit 322, and a fiber-optic cable 324 composed essentially of a bundle of a number of optical fibers for transmitting the individual color components of the light that have passed through the disk-like color filter 323 to the PLZT shutter array 321.

Figure 4:
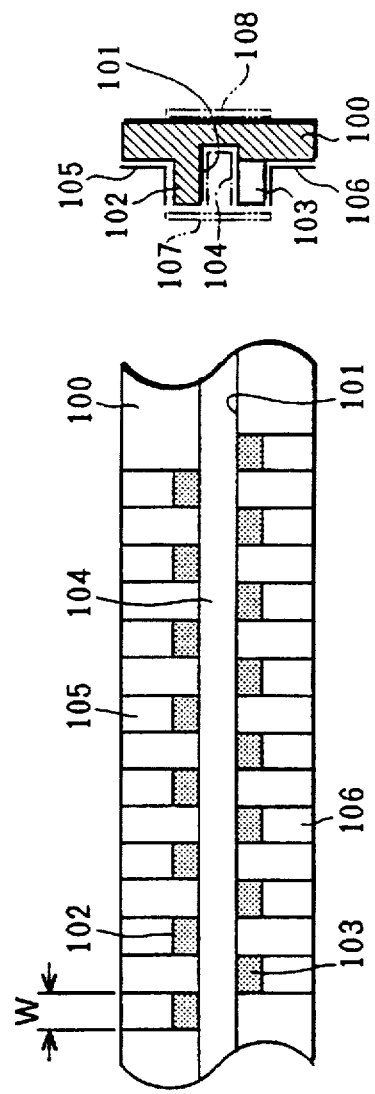
FIGS. 4A and 4B are a plan view and a cross-sectional side view of a PLZT shutter array of the second exposure unit shown in FIG. 3, respectively.

Referring to FIGS. 4A and 4B, the PLZT shutter array 321 is formed from a translucent ferroelectric ceramic material obtained by adding lanthanum to lead zirconate titanate and utilizes electro-optical properties of the material. More particularly, the PLZT shutter array 321 comprises an elongate PLZT device 100 with a number of projections 102, 103 arranged on each side of a U-shaped groove 101 which is formed in the PLZT device 100 along its longitudinal center line, wherein the projections 102 are offset from the projections 103 in a longitudinal direction of the PLZT device 100 so that they alternately flank each side of the U-shaped groove 101 as illustrated in FIGS. 4A and 4B. A common electrode 104 is formed to cover surfaces of the U-shaped groove 101 and inside surfaces of the individual projections 102, 103, while driving electrodes 105, 106 are formed on outside surfaces of the individual projections 102, 103 and adjacent flat portions of the surface of the PLZT device 100. The PLZT shutter array 321 further comprises polarizing films 107 and 108 mounted on the side of the projections 102, 103 and on the bottom side of the PLZT device 100, respectively, with their planes of polarization intersecting at right angles to each other.

When a specified level of driving voltage is applied across the common electrode 104 and each of the driving electrodes 105, 106 of the PLZT shutter array 321 thus constructed, light entering through the polarizing film 108 passes between the projections 102, 103 and is transmitted through the polarizing film 107. On the contrary, when the driving voltage is removed, the incident light is interrupted. This means that the polarizing film 107 (which is shown by an alternate long and two short dashed line in FIG. 4B) mounted on the side of the projections 102, 103 acts as an array of shutter elements (light output elements) which determine whether or not the incident light is allowed to pass through the PLZT device 100. The individual shutter elements are arranged to match the positions of individual pixels of input image data. When driving voltages are applied to particular shutter elements corresponding to the positions of chosen pixels of the image data, those shutter elements open and the light emitted by the white light source unit 322 and passed through the disk-like color filter 323 falls upon the photographic printing paper 13 and exposes it.

The number of shutter elements of the PLZT shutter array 321 is made equal to the number of pixels in each line of the input image data (which has 2048 pixels per line in this embodiment). The exposure controller 36 delivers each successive single-line portion of the image data containing the R, G and B components fed from the line buffer 23 to the driving power supply 34 and the image data output controller 35, and the driving power supply 34 transmits specific driving voltages to the individual shutter elements corresponding to the individual pixels of the input image data under the control of the image data output controller 35.

The white light source unit 322 incorporates a halogen lamp and a mirror tunnel which guides the light emitted by the halogen lamp to the fiber-optic cable 324, for example. The lamp of the white light source unit 322 is kept continuously ON when the second exposure processor 30 is in operation. As shown in FIG. 3, the disk-like color filter 323 is divided into three color portions, that is, red, green and blue sectors arranged counterclockwise in this order as illustrated. The disk-like color filter 323 is rotated at a constant speed by a driving motor 331 so that the individual color sectors of the disk-like color filter 323 are successively located in front of the white light source unit 322. The color filter controller 33 controls the rotation of the driving motor 331 in such a way that the individual color sectors of the disk-like color filter 323 come in front of the white light source unit 322 in synchronism with the R, G and B components of the input image data.

The driving power supply 34 comprises a voltage level converter 341 which makes it possible to supply driving voltages corresponding to each of the RGB components of light incoming through the disk-like color filter 323 to the individual shutter elements of the PLZT shutter array 321. Specifically, the voltage level converter 341 can output a voltage variable within a specific range about a reference voltage of 55 V for the red component, a voltage variable within a specific range about a reference voltage of 50 V for the green component, a voltage variable within a specific range about a reference voltage of 45 V for the blue component, for example. The intensities of light output through the individual shutter elements are made approximately of the same level for the R, G and B components by applying the driving voltages individually adjusted in accordance with light transmittances of the individual shutter elements for the three primary color components.

More particularly, the driving voltages applied to the individual shutter elements are controlled as follows. The voltage level converter 341 incorporates a digital-to-analog (D/A) converter, for instance, to control the levels of the driving voltages to be applied to the individual shutter elements for the R, G and B components. On the other hand, a data memory 82, which will be described later, stores particular voltage data obtained from multiple sets of voltage data, and the driving power supply 34 controls the voltage level converter 341 to output the driving voltages of specific levels determined with reference to the voltage data stored in the data memory 82. Alternatively, the voltage level converter 341 may be configured by using a non-saturation area of a transistor.

The image data output controller 35 outputs signals to specific shutter elements in accordance with the image data fed from the line buffer 23 and causes the shutter elements corresponding to pixels covered by the image data by applying driving voltages individually adjusted for the R, G and B components to the shutter elements of the PLZT shutter array 32 1. The R, G and B components of light separated by the disk-like color filter 323 and transmitted through the fiber-optic cable 324 are output onto the photographic printing paper 13 to expose the same area of the photographic printing paper 13 three successive times with the individual primary color components of light.

The exposure controller 36 controls the second printing paper transport controller 314, the color filter controller 33, the driving power supply 34 and the image data output controller 35 synchronously according to the R, G and B components of the image data fed from the line buffer 23 as described above in order to expose the photographic printing paper 13 with each frame image on the negative film 11 or with a reference image with high precision.

Referring again to FIG. 1, the development processor 40 comprises a liquid tank 41 charged with a developing solution. A portion of the unrolled photographic printing paper 13 exposed at the second exposure unit 32 is advanced by an exposed printing paper transport (not shown) which is located on a downstream side of the liquid tank 41 and dipped into the developing solution in the liquid tank 41 to develop latent images formed on the photographic printing paper 13 by exposures at the first exposure unit 15 and the second exposure processor 30 into visible images.

The cutting unit 50 includes a cutter 51 for cutting the photographic printing paper 13 widthwise upon completion of a development process at the development processor 40 and a subsequent drying process. More particularly, the foremost portion of the photographic printing paper 13 is advanced by a developed printing paper transport (not shown) which is located on an upstream side of the cutter 51 and cut into individual picture frames, or photographic paper prints 13', which are delivered to the discharge unit 60 having an output tray 61. The cutter 51 is associated with a driving motor 511 and a cutter controller 512 for controlling the driving motor 511.

In the aforementioned construction, the first exposure processor 10 or the second exposure processor 30 is selectively used in principle. When exposing the unrolled photographic printing paper 13 directly with the negative film 11 at the first exposure processor 10, the shutter 153 of the first exposure unit 15 and related system elements are activated by commands transmitted from the system controller 90, and the photographic printing paper 13 is successively exposed with images recorded in individual frames of the negative film 11 which is advanced by the film transport 12.

The exposed portion of the photographic printing paper 13 is further advanced to the development processor 40 to go through the developing process, and cut into individual paper prints 13' at the cutting unit 50. The cut paper prints 13' are delivered onto the output tray 61 of the discharge unit 60 and put into a receiving box provided on a downstream side by a transport mechanism which is not illustrated.

When exposing the unrolled photographic printing paper 13 at the second exposure processor 30, each successive single-line portion of the already stored image data containing the R, G and B components to be used for each exposure at the second exposure processor 30 is read from the frame image data memory 21 of the image information storing unit 20 and delivered to the line buffer 23 in accordance with commands transmitted from the system controller 90.

The exposure controller 36 sequentially reads out the R, G and B components of each successive single-line portion of the image data from the line buffer 23 and outputs them to the color filter controller 33, the driving power supply 34 and the image data output controller 35. The color filter controller 33 causes the driving motor 331, shown in FIG. 5, to rotate at a constant speed in a precisely controlled manner so that the red, green and blue sectors of the disk-like color filter 323 successively come in front of the white light source unit 322 in synchronism with the R, G and B components of the image data received from the line buffer 23.

The driving power supply 34 and the image data output controller 35 controllably drive the PLZT shutter array 321. Specifically, the driving power supply 34 and the image data output controller 35 output driving voltages of different levels depending on the R, G and B components, and selectively apply them to those shutter elements of the PLZT shutter array 321 which correspond to pixels to be exposed. The driving voltages applied to the PLZT shutter array 321 are altered, or adjusted, from one shutter element to another even for each of the three primary color components by supplying specific levels of voltages from the voltage level converter 341 of the driving power supply 34 in order to approximately equalize the intensity of light output through the individual shutter elements. Duration of the driving voltages applied to the PLZT shutter array 321 is made equal for the individual shutter elements. This ensures that the unrolled photographic printing paper 13 is exposed with minimal variations in exposure level among the individual shutter elements.

Referring again to FIG. 1, the photographic printing paper 13 has been exposed with one single line of the image data, the exposure controller 36 causes the second printing paper transport 31 to advance the photographic printing paper 13 one exposure line forward to subsequently make an exposure of the photographic printing paper 13 with a next single line of the image data. The exposure controller 36 drives the second printing paper transport 31 so that the second printing paper transport 31 advances the unrolled photographic printing paper 13 in successive steps at a speed synchronized with exposure time required for each line of the image data at the second exposure unit 32. The photographic printing paper 13 is sequentially exposed in this manner until a complete image of each picture frame is formed on the photographic printing paper 13.

A portion of the photographic printing paper 13 already exposed at the second exposure processor 30 is advanced stepwise to the development processor 40 to go through a developing process, and cut into the individual paper prints 13' at the cutting unit 50. The cut paper prints 13' are delivered onto the output tray 61 of the discharge unit 60 and put into the receiving box provided on the downstream side by the illustrated transport mechanism.

The measuring unit 70 is for measuring photographic densities of the R, G and B components of individual pixels of a reference image formed on a cut paper print 13' using the reference image data. The measuring unit 70 comprises a scanner 71 which travels over the paper print 13' from side to side in a direction perpendicular to the direction in which the photographic printing paper 13 is advanced, a scanner mover 72 for controlling movements of the scanner 71, an optical filter 73 which is located between the scanner 71 and the paper print 13' and made movable in the same direction as the scanner 71 for separating an image printed on the paper print 13' into R, G and B components, a filter mover 74 for controlling movements of the optical filter 73, and a measurement controller 75 for controlling measurement of pixel densities by the scanner 71.

Figure 5:
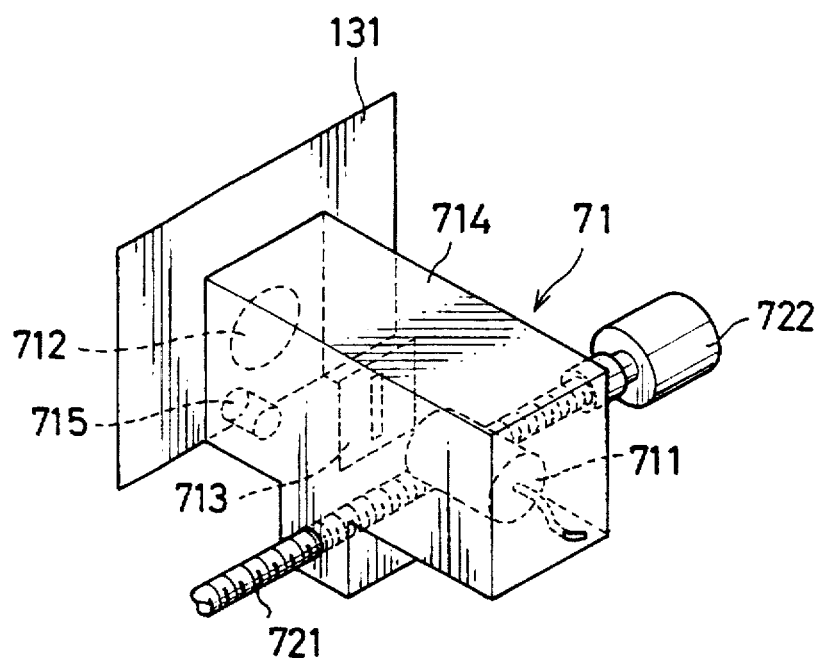
FIG. 5 is a perspective diagram showing a construction of a scanner of the automatic photograph printing system of FIG. 1.

Referring to FIG. 5, the scanner 71 includes a density sensor 711 composed essentially of a CCD chip, for instance, having the same number of equally-spaced light-sensing elements as the shutter elements of the PLZT shutter array 321, or a smaller number of light-sensing elements arranged at several times (5 to 10 times) larger intervals than the shutter elements, a lens 712 for focusing the image printed on the paper print 13' onto the density sensor 711, a slit plate 713 located between the density sensor 711 and the lens 712 for limiting an image area from which pixel densities are measured, and an enclosure 714 accommodating the density sensor 711, the lens 712 and the slit plate 713. There is further provided a white light source 715 at the front of the enclosure 714 for illuminating the surface of the cut paper print 13'.

Figure 6:
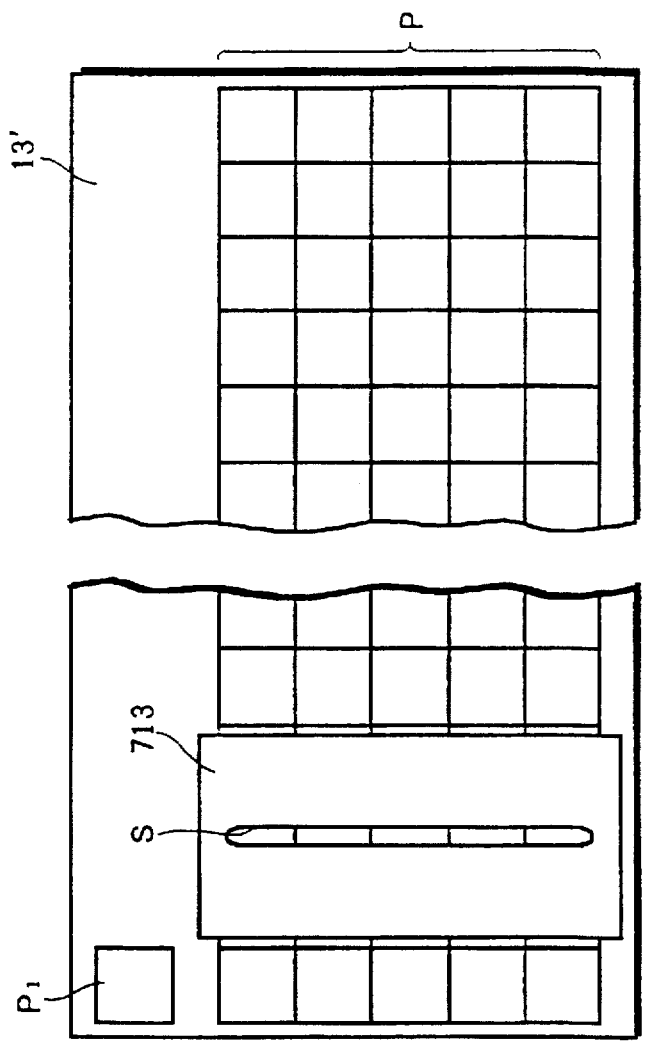
FIG. 6 is a diagram showing a construction of a slit plate provided in the scanner of the automatic photograph printing system of FIG. 1.

Referring to FIG. 6, the slit plate 713 has a slit S long enough to cover an image portion P corresponding to at least five pixel lines of the reference image printed on a cut paper print 13', with long axis of the slit S aligned parallel to the moving direction of the unrolled photographic printing paper 13. The length of the slit S allows the scanner 71 to simultaneously measure the pixel densities of five pixel lines of the image formed by successive exposures through the shutter elements of the PLZT shutter array 321. This means that the slit plate 713 focuses five pixel lines covered by the slit S onto the density sensor 711 at a time, making it possible to measure average pixel densities produced by the individual shutter elements of the PLZT shutter array 321.

Referring to FIGS. 1 and 5, the scanner mover 72 includes a drive shaft 721 such as a ball screw mounted at right angles to the moving direction of the unrolled photographic printing paper 13, a driving motor 722 which can rotate the drive shaft 721 either in its forward or reverse direction, and a scanner mover controller 723 for controlling the driving motor 722. Since the enclosure 714 of the scanner 71 is fixed to the drive shaft 721, the enclosure 714 travels across the cut paper print 13' widthwise when the driving motor 722 turns the drive shaft 721 in accordance with a control signal fed from the scanner mover controller 723. The scanner 71 is moved at a high speed in steps equal to pixel intervals to sequentially measure the pixel densities.

The filter mover 74 includes a driving motor 741 and a filter mover controller 742 for controlling the rotation of the driving motor 741. The filter mover 74 moves the optical filter 73 in synchronism with measurements of photographic densities of the R, G and B components by the scanner 71 to control the positions of red, green and blue color segments of the optical filter 73 relative to the scanner 71.

The measurement controller 75 transmits a measuring timing signal to the density sensor 711 to cause it to sequentially measure the pixel densities of the reference image formed on the cut paper print 13' based on the reference image data in synchronism with the movement of the scanner 71. The measurement controller 75 also transmits a density data readout timing signal to the density sensor 711 and reads density data from the density sensor 711. Since the density data is read separately for the R, G and B components, three successive measurements are made for the same pixels while shifting the color segments of the optical filter 73. Although the R, G and B components of the reference image data expose the same area of the unrolled photographic printing paper 13 in the foregoing embodiment, different areas of the unrolled photographic printing paper 13 may be exposed separately with the R, G and B components. In this case, pixel densities of the R, G and B components are measured in the respective exposed areas of the photographic printing paper 13.

The data conversion unit 80 includes a data converter 81 which converts the density data for the R, G and B components of the individual pixels read by the scanner 71 into correction data for altering the driving voltages to be applied to the individual shutter elements of the PLZT shutter array 321 to reduce variations in the intensity of light output through the individual shutter elements, the earlier-mentioned data memory 82 for storing data on current driving voltages obtained by using the correction data given by the data converter 81, and a multiplier 83 which obtains specific voltage data by multiplying the correction data output from the data converter 81 by the current driving voltages stored in the data memory 82. Correction for reducing variations in the intensity of light output through the individual shutter elements of the PLZT shutter array 321 requires a two-step process. Firstly, intensity levels of the R, G and B components of light output through the PLZT shutter array 321 are adjusted so that a combination of the R, G and B components becomes gray as obtained from the reference image data. Secondly, intensities of light output through the individual shutter elements are adjusted to obtain approximately the same level of pixel densities.

The data converter 81 converts the density data into the correction data in the following manner. Recognizing that photographic density (logarithm D) is given by multiplying incident light intensity (logarithm I) by a coefficient (k) whose value is dependent by the type of printing paper, densities obtained for the individual pixels are divided by the coefficient (k), which is determined by the type of the photographic printing paper 13, to derive light intensity data ($10^I = 10^{D/k}$) for the individual pixels. The ratio (S) of the light intensity (logarithm I) of each individual pixel to the light intensity (logarithm I1) of the darkest pixel is calculated, and the reciprocal of this ratio ($S = 10^I/10^{I1}$) is adopted as correction data (C=1/S).

Current driving voltages applied to the individual shutter elements of the PLZT shutter array 321 that are stored in the data memory 82 are multiplied by individual values of the correction data calculated for all the pixels by the data converter 81 to produce updated voltage data, which is then stored into the data memory 82, overwriting the existing voltage data. The exposure controller 36 reads the voltage data stored for each line in the data memory 82 and outputs it to the driving power supply 34. The driving power supply 34 causes the voltage level converter 341 to output driving voltages corresponding to the received voltage data and apply the driving voltages to the respective shutter elements of the PLZT shutter array 321. More particularly, if the value of the correction data for a particular shutter element is 1 (C=1), the same driving voltage as the one applied before correction is applied to that shutter element. If, however, the value of the correction data for a particular shutter element is less than 1 (C<1), a driving voltage lower than the one applied before the correction is applied to that shutter element to reduce its light transmittance, whereby the intensity of light passing through that shutter element becomes approximately equal to that passing through a shutter element which produces the darkest pixel. The voltage data once stored in the data memory 82 as described above is used for subsequent exposures until new correction data is calculated and stored in the data converter 81.

Although the driving voltages applied to the PLZT shutter array 321 are initially adjusted to minimize differences in output light intensity among the individual shutter elements, these differences can increase due to changes in output characteristics of the PLZT shutter array 321 with the lapse of time. When this has occurred, the differences in output light intensity among the individual shutter elements are minimized again by adjusting the output light intensity of each shutter element to that of a shutter element which produces the darkest pixel to prevent deterioration of the quality of exposures.

The current driving voltages may be simply multiplied by the individual values of the correction data as described above if they have a linearly proportional relationship. If this is not the case, however, a practical approach is to have the data memory 82 store a coefficient table, and multiply the driving voltages by coefficients read from the coefficient table appropriate for the correction data. The intensity of light output through the PLZT shutter array 321 drops as a whole when the output light intensity of each shutter element is adjusted to match that of the shutter element producing the darkest pixel. If this causes any adverse effects on the quality of exposures, the intensity of light emitted by the white light source unit 322 may be increased, for instance, to make up for the reduction in the output light intensity of each shutter element. Alternatively, the driving voltages to be applied to the individual shutter elements may be intentionally set to low levels in the beginning. In this alternative, the driving voltage applied to the shutter element producing the lowest output light intensity is increased before adjusting the driving voltages applied the other shutter elements when correction is required at a later time.

In the present embodiment, the driving power supply 34, the exposure controller 36, the data converter 81 and the data memory 82 constitute together a correction circuit for adjusting the output light intensity of each shutter element to reduce differences in exposure levels among the individual shutter elements of the PLZT shutter array 321. The driving power supply 34, the exposure controller 36 and the data memory 82 also constitute together a light intensity adjuster, which adjusts the light transmittances of the individual shutter elements by altering the driving voltages applied to them.

While the image data stored in the frame image data memory 21 is sequentially transmitted through the line buffer 23 to expose the photographic printing paper 13, the reference image data stored in the reference image data memory 22 is transmitted through the line buffer 23 in a similar way to expose the photographic printing paper 13 at the second exposure unit 32. When a cut paper print 13' exposed with the reference image is output onto the output tray 61 of the discharge unit 60, the measuring unit 70 is activated in synchronism with the print ejecting operation. The scanner 71 then scans the cut paper print 13' widthwise to measure the densities of the individual pixels of the printed reference image. The data converter 81 converts resultant density data into correction data, and the driving voltages applied to the individual shutter elements of the PLZT shutter array 321 are corrected in accordance with the correction data. Subsequently, the PLZT shutter array 321 is operated with the driving voltages thus corrected.

Although the unrolled photographic printing paper 13 is exposed with the reference image at regular time intervals after activation of the second exposure processor 30 in accordance with commands transmitted from the system controller 90 in the aforementioned embodiment, the photographic printing paper 13 may be exposed with the reference image each time the photographic printing paper 13 is advanced by a specified length. In another alternative, the photographic printing paper 13 may be exposed with the reference image only once at the startup of the automatic photograph printing system to correct the driving voltages applied to the individual shutter elements in the beginning.

The system controller 90 includes a central processing unit (CPU) and a read-only-memory (ROM) for storing a control program which are not illustrated. The system controller 90 performs overall system control of the individual controllers by transmitting commands to them in accordance with the control program.

In the foregoing embodiment, differences in exposure levels among the individual shutter elements are reduced by altering the driving voltages applied to them without varying the duration of each driving voltage when the differences have increased due to changes in the output characteristics of the PLZT shutter array 321. In an alternative approach, the differences in exposure levels may be reduced by varying the duration of each driving voltage individually applied to the shutter elements of the PLZT shutter array 321 without altering the driving voltages applied to them.

Figure 7:
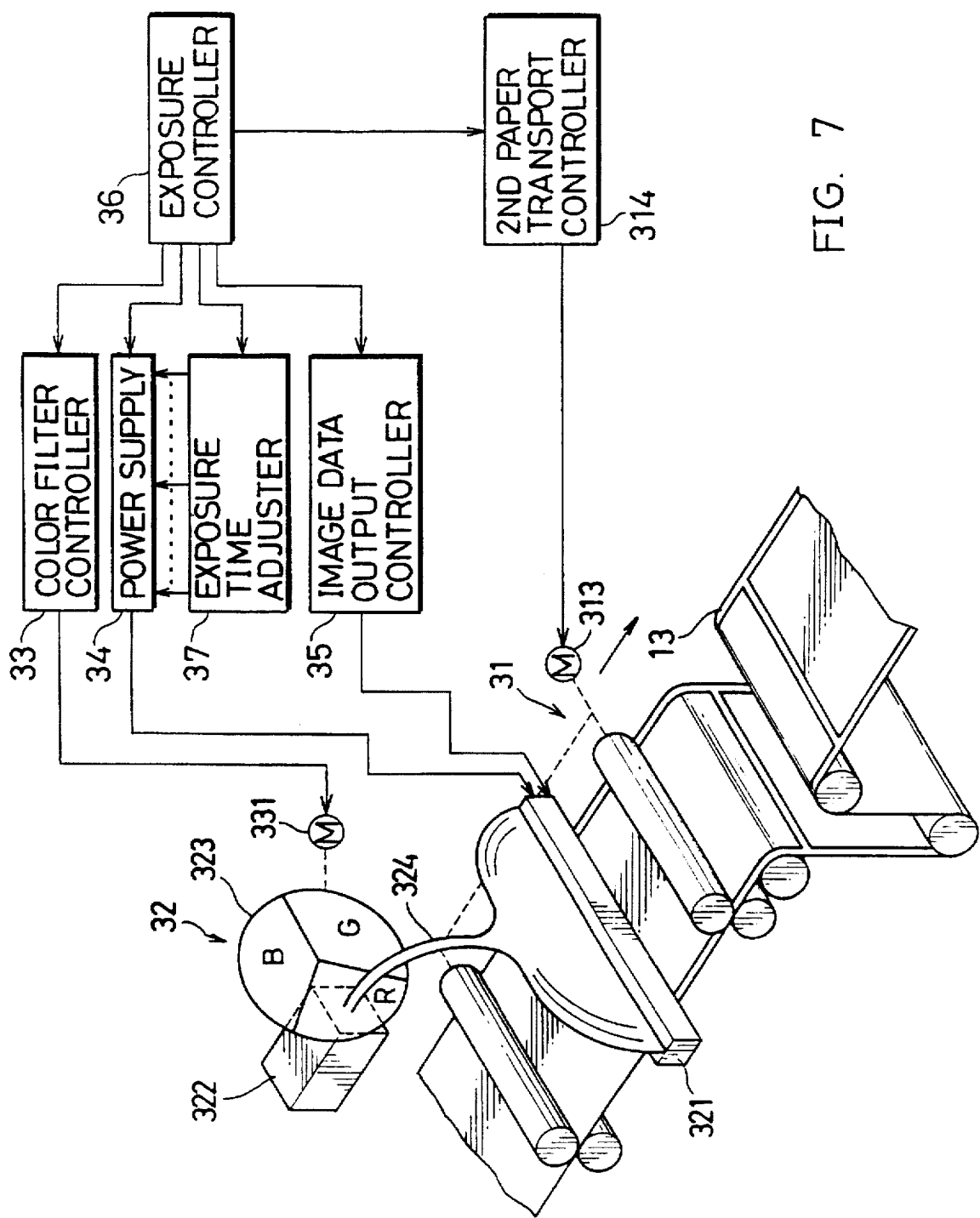
FIG. 7 is a diagram showing an alternative configuration of the second exposure unit of the automatic photograph printing system.

Shown in FIG. 7 is an alternative configuration of the second exposure unit 32, in which the driving power supply 34 is associated with an exposure time adjuster 37 for adjusting the duration of each driving voltage applied to the individual shutter elements. Specifically, the exposure time adjuster 37 adjusts the duration of each driving voltage individually applied from the driving power supply 34 to the shutter elements based on the aforementioned correction data calculated by the data converter 81. The data memory 82 stores time data defining specific time durations chosen from 256 values for the individual shutter elements. Current time duration settings which define durations of the driving voltages applied to the individual shutter elements that are stored in the data memory 82 are multiplied by individual values of the correction data given by the data converter 81 to produce updated time data, which is then stored into the data memory 82, overwriting the existing time data.

The exposure controller 36 reads the time data stored for each line in the data memory 82 and outputs it to the exposure time adjuster 37. The exposure time adjuster 37 stores the time data which sets time durations of the driving voltages applied to the individual shutter elements. The driving power supply 34 applies the driving voltages to the individual shutter elements for the time durations specified in accordance with the received time data. More particularly, if the value of the correction data for a specific shutter element is 1 (C=1), the driving voltage is applied to that shutter element for the same time duration as was set before correction. If, however, the value of the correction data for a particular shutter element is less than 1 (C<1), the driving voltage is applied to that shutter element for a shorter time duration than the time duration set before the correction so that the exposure level achieved with that shutter element becomes approximately equal to the exposure level achieved with a shutter element which produces the darkest pixel. The time data once stored in the data memory 82 as described above is used for subsequent exposures until new correction data is calculated and stored in the data converter 81.

The exposure level achieved with each shutter element is adjusted to match the exposure level achieved with the shutter element producing the darkest pixel as described above. If this causes any adverse effects on the quality of exposures, the intensity of light emitted by the white light source unit 322 may be increased, for instance, to make up for the reduction in the exposure level achieved with each shutter element. Alternatively, the time durations of the driving voltages applied to the individual shutter elements may be intentionally set to low values in the beginning. In this alternative, the time duration of the driving voltage applied to the shutter element producing the lowest exposure level is increased before adjusting the time durations of the driving voltages applied the other shutter elements when correction is required at a later time.

In this varied form of the preferred embodiment, the driving power supply 34, the exposure controller 36, the exposure time adjuster 37, the data converter 81 and the data memory 82 constitute together a correction circuit for adjusting the exposure level achieved with each shutter element to reduce differences in exposure levels among the individual shutter elements of the PLZT shutter array 321. The driving power supply 34, the exposure controller 36, the exposure time adjuster 37 and the data memory 82 also constitute together an exposure time adjuster, which adjusts exposure times of the individual shutter elements by altering the time durations of the driving voltages individually applied from the driving power supply 34 to the shutter elements.

While the second exposure unit 32 mainly comprises the PLZT shutter array 321, the white light source unit 322, the disk-like color filter 323 and the fiber-optic cable 324 in the foregoing embodiment, an array of light emitting diodes (LED's) or a liquid crystal display (LCD) may be employed instead of the PLZT shutter array 321. In such alternative configuration, it is still possible to correct the exposure level of each pixel by adjusting the level or time duration of the driving voltage applied to each light output element of the LED array or LCD in a similar way to the PLZT shutter array 321. It is also possible to correct the exposure level of each pixel by allowing simultaneous adjustment of both the level and time duration of the driving voltage applied to each light output element.

While the preferred embodiment employs the disk-like color filter 323 to enable separate exposures with the three primary color components, the disk-like color filter 323 is not required for exposures with black-and-white images. The disk-like color filter 323 may be eliminated even when producing color prints if there are provided separate red, green and blue light sources. Furthermore, although the scanner 71 is located above the discharge unit 60 where each paper print 13' is ejected in the foregoing preferred embodiment, the scanner 71 may be located outside the automatic photograph printing system.

As mentioned above, the image exposure system is provided with the exposure unit having a plurality of light output elements for converting image data into a light signal which causes a specific level of exposure of each pixel and outputting the light signal onto photographic printing paper to expose it, a measuring device for measuring the density of each pixel of an image produced by exposing the photographic printing paper with reference image data at the exposure unit, and a compensator for correcting exposure levels achieved with the individual light output elements based on measurement results obtained by the measuring device to reduce differences in the exposure levels among the individual light output elements caused by changes in output characteristics of the exposure unit. Accordingly, the image exposure system makes it possible to automatically correct the exposure levels achieved with the individual light output elements to reduce the differences in the exposure levels based on pixel density data obtained by the measuring device. Furthermore, it can avoid an increase in physical dimensions of the exposure unit since it is no longer required to install an optical sensor in the exposure unit.

Also, the compensator corrects the exposure levels achieved with the individual light output elements by altering their output light intensities. The compensator includes a data converter for converting density data obtained by the measuring device into correction data which is used for altering the exposure levels and a light intensity adjuster for altering the output light intensities of the individual light output elements in accordance with the correction data received from the data converter. Accordingly, the density data obtained by the measuring device is converted into the correction data which is used for adjusting the output light intensities of the individual light output elements. This arrangement makes it possible to automatically alter the output light intensities of the individual light output elements to reduce the differences in the exposure levels achieved with the individual light output elements.

Further, the exposure unit is provided with the PLZT shutter array composed essentially of an array of multiple shutter elements which constitute the light output elements and are controllably opened and closed by individually applied driving voltages. The light intensity adjuster adjusts light transmittances of the individual shutter elements by individually altering the driving voltages applied to them. Accordingly, the light transmittances of the individual shutter elements can be properly adjusted by altering the driving voltages applied to them to reduce the differences in the exposure levels achieved with the individual light output elements.

Furthermore, the compensator corrects the exposure levels achieved with the individual light output elements by altering their exposure times. In this case, the compensator is provided with the exposure time adjuster for altering the exposure times of the individual light output elements in accordance with the correction data received from the data converter. Accordingly, the density data obtained by the measuring device is converted into the correction data which is used for adjusting the exposure times of the individual light output elements. This arrangement makes it possible to automatically alter the exposure times of the individual light output elements to reduce the differences in the exposure levels achieved with the individual light output elements.

Also, the exposure time adjuster adjusts the exposure times of the individual shutter elements by individually altering time durations of the driving voltages applied to them. The exposure times of the individual shutter elements can be properly adjusted by altering the time durations of the driving voltages applied to them to reduce the differences in the exposure levels achieved with the individual light output elements.

Furthermore, the image exposure system is provided with the controller for controlling exposure operation of the exposure unit and measuring operation of the measuring device in such a way that the exposure unit exposes the photographic printing paper with the reference image data at regular time intervals and the measuring device measures the density of each pixel of the image produced by exposing the photographic printing paper with the reference image data. The exposure levels achieved with the individual light output elements can be corrected at regular time intervals based on the pixel density data obtained by measuring the density of each pixel of the image produced by exposing the photographic printing paper with the reference image data.

Alternatively, the image exposure system is further provided with the controller for controlling exposure operation of the exposure unit and measuring operation of the measuring device in such a way that the exposure unit exposes the photographic printing paper with the reference image data each time the photographic printing paper is advanced by a specified length and the measuring device measures the density of each pixel of the image produced by exposing the photographic printing paper with the reference image data. The exposure levels achieved with the individual light output elements can be corrected each time the photographic printing paper is advanced by the specified length based on the pixel density data obtained by measuring the density of each pixel of the image produced by exposing the photographic printing paper with the reference image data.

Moreover, the image exposure system is provided with the development processor for developing an exposed portion of the photographic printing paper and the discharge for outputting each paper print developed by the development processor, the measuring device being located in the vicinity of the discharge. This makes it possible to automatically correct the exposure levels achieved with the individual light output elements based on the pixel density data obtained by directly measuring the density of each pixel on a paper print delivered from the discharge.

The individual light output elements of the exposure unit are so controlled that the photographic printing paper is exposed with each successive line of an image. The measuring device is provided with the slit plate having a slit through which the density of pixels in a plurality of pixel lines formed by each light output element can be measured at a time. This makes it possible to measure average pixel densities produced by the individual light output elements through the slit.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image exposure system for printing an image, comprised of pixels, on photosensitive media based on image data, said image exposure system comprising:

an exposure unit for converting said image data into a light signal for exposure of each of said pixels, said exposure unit having light output elements for outputting the light signal for respective ones of said pixels onto said photosensitive media to effect exposure of said image on said photosensitive media;

a measuring device for measuring a density of each of said pixels of said image on said photosensitive media produced by exposing the photosensitive media with reference image data as said image data; and a compensator for correcting exposure levels of said pixels based on density data obtained by said measuring device, using the density data of a darkest one of said pixels as a reference to reduce differences between the exposure levels produced by respective ones of the light output elements caused by changes in output characteristics of said exposure unit.

2. The image exposure system as defined in claim 1, wherein said compensator includes:

a data converter for converting said density data obtained by said measuring device into correction data for correcting the exposure levels; and a light intensity adjuster for altering output light intensities of each of said light output elements in accordance with the correction data received from said data converter to correct the exposure level of each of said light output elements.

3. The image exposure system as defined in claim 2, wherein:

said exposure unit includes a PLZT shutter array having an array of shutter elements as said light output elements, controllably opened and closed by individually applied driving voltages; and said light intensity adjuster adjusts light transmittances of individual ones of said shutter elements by individually altering the driving voltages applied to them.

4. The image exposure system as defined in claim 2, further comprising a controller for controlling exposure operation of said exposure unit and measuring operation of said measuring device such that said exposure unit exposes the photosensitive media with said reference image data at regular time intervals and said measuring device measures the density of each of said pixels of the image produced by exposing the photosensitive media using said reference image data.

5. The image exposure system as defined in claim 1, wherein said compensator includes:

a data converter for converting said density data obtained by said measuring device into correction data for correcting the exposure levels; and an exposure time adjuster for altering exposure times of each of the light output elements in accordance with the correction data received from said data converter to correct the exposure level of each of said light output elements.

6. The image exposure system as defined in claim 5, wherein:

said exposure unit includes a PLZT shutter array having an array of shutter elements, as said light output elements, controllably opened and closed by individually applied driving voltages; and said exposure time adjuster adjusts the exposure times of individual ones of said shutter elements by individually altering time durations of the driving voltages applied respectively to said individual ones of said shutter elements.

7. The image exposure system as defined in claim 5, further comprising a controller for controlling exposure operation of said exposure unit and measuring operation of said measuring device such that said exposure unit exposes the photosensitive media with said reference image data at regular time intervals and said measuring device measures the density of each of said pixels of the image produced by exposing the photosensitive media using said reference image data at said regular time intervals.

8. The image exposure system as defined in claim 1, further comprising:

a development processor for developing an exposed portion of the phhotosensitive media to produce a paper print;

a discharge mechanism for outputting said paper print developed by the development processor; and said measuring device being located in vicinity of said discharge mechanism.

9. The image exposure system as defined in claim 1, further comprising a controller for controlling exposure operation of said exposure unit and measuring operation of said measuring device such that said exposure unit exposes the photosensitive media with said reference image data each time the photosensitive media is advanced by a specified length and said measuring device measures the density of each of said pixels of the image produced by exposing the photosensitive media with said reference image data.

10. The image exposure system of claim 1 wherein:

said exposure unit includes means for controlling the light output elements of such that the photosensitive media is exposed with each successive pixel line of said image; and said measuring device includes a slit plate having a slit through which the density of pixels in a plurality of said pixel lines formed by each of said light output elements is measured at one time to obtain an average density of said pixels in said pixel line for a given one of said light output elements.

11. An image exposure system for printing an image, comprised of pixels, on photosensitive media based on image data, said image exposure system comprising:

an exposure unit for converting said image data into a light signal for exposure of each of said pixels, said exposure unit having light output elements for outputting the light signal for respective ones of said pixels onto said photosensitive media to effect exposure of said image on said photosensitive media;

a measuring device for measuring a density of each of said pixels of said image on said photosensitive media produced by exposing the photosensitive media with reference image data as said image data;

a compensator for correcting exposure levels of said pixels based on density data obtained by said measuring device to reduce differences between the exposure levels produced by respective ones of the light output elements caused by changes in output characteristics of said exposure unit;

said compensator including:

a data converter for converting said density data obtained by said measuring device into correction data for correcting the exposure levels; and a light intensity adjuster for altering output light intensities of each of said light output elements in accordance with the correction data received from said data converter; and a controller for controlling exposure operation of said exposure unit and measuring operation of said measuring device such that said exposure unit exposes the photosensitive media with said reference image data each time the photosensitive media is advanced by a specified length and said measuring device measures the density of each of said pixels of the image produced by exposing the photosensitive media with said reference image data.

12. The image exposure system of claim 11 wherein the compensator corrects exposure levels of said pixels using the density data of a darkest one of said pixels as a reference to reduce said differences between the exposure levels produced by said respective ones of the output elements.

13. An image exposure system for printing an image, comprised of pixels, on photosensitive media based on image data, said image exposure system comprising:

an exposure unit for converting said image data into a light signal for exposure of each of said pixels, said exposure unit having light output elements for outputting the light signal for respective ones of said pixels onto said photosensitive media to effect exposure of said image on said photosensitive media;

a measuring device for measuring a density of each of said pixels of said image on said photosensitive media produced by exposing the photosensitive media with reference image data as said image data;

a compensator for correcting exposure levels of said pixels based on density data obtained by said measuring device to reduce differences between the exposure levels produced by respective ones of the light output elements caused by changes in output characteristics of said exposure unit;

said compensator including:

a data converter for converting said density data obtained by said measuring device into correction data for correcting the exposure levels; and an exposure time adjuster for altering exposure times of each of the light output elements in accordance with the correction data received from said data converter to correct the exposure level of each of said light output elements; and a controller for controlling exposure operation of said exposure unit and measuring operation of said measuring device such that said exposure unit exposes the photosensitive with said reference image data each time the photographic printing paper is advanced by a specified length and said measuring device measures the density of each of said pixels of the image produced by exposing the photographic printing paper with said reference image data.

14. The image exposure system of claim 13 wherein the compensator corrects exposure levels of said pixels using the density data of a darkest one of said pixels as a reference to reduce said differences between the exposure levels produced by said respective ones of the light output elements.

15. An image exposure system for printing an image, comprised of pixels, on photosensitive media based on image data, said image exposure system comprising:

an exposure unit for converting said image data into a light signal for exposure of each of said pixels, said exposure unit having light output elements for outputting the light signal for respective ones of said pixels onto said photosensitive media to effect exposure of said image on said photosensitive media;

a measuring device for measuring a density of each of said pixels of said image on said photosensitive media produced by exposing the photosensitive media with reference image data as said image data;

a compensator for correcting exposure levels of said pixels based on density data obtained by said measuring device to reduce differences between the exposure levels produced by respective ones of the light output elements caused by changes in output characteristics of said exposure unit;

said exposure unit including means for controlling the light output elements of such that the photosensitive media is exposed with each successive pixel line of said image; and said measuring device including a slit plate having a slit through which the density of pixels in a plurality of said pixel lines formed by each of said light output elements is measured at one time to obtain an average density of said pixels in said pixel line for a given one of said light output elements.

16. The image exposure system of claim 15 wherein the compensator corrects exposure levels of said pixels using the density data of a darkest one of said pixels as a reference to reduce said differences between the exposure levels produced by said respective ones of the light output elements.

* * * * *